United States Patent
Koslowski et al.

(10) Patent No.: US 10,730,116 B2
(45) Date of Patent: Aug. 4, 2020

(54) ELECTRICAL HANDHELD CORE DRILLING DEVICE

(71) Applicant: Hilti Aktiengesellschaft, Schaan (LI)

(72) Inventors: Oliver Koslowski, Puergen (DE); John Van Taack-Trakranen, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/081,331

(22) PCT Filed: Mar. 2, 2017

(86) PCT No.: PCT/EP2017/054865
§ 371 (c)(1),
(2) Date: Aug. 30, 2018

(87) PCT Pub. No.: WO2017/149061
PCT Pub. Date: Sep. 8, 2017

(65) Prior Publication Data
US 2019/0022766 A1    Jan. 24, 2019

(30) Foreign Application Priority Data
Mar. 3, 2016  (EP) ..................................... 16158453

(51) Int. Cl.
*B23B 31/113*   (2006.01)
*B23B 51/04*    (2006.01)
*B23B 31/00*    (2006.01)

(52) U.S. Cl.
CPC .......... *B23B 31/113* (2013.01); *B23B 31/008* (2013.01); *B23B 31/005* (2013.01);
(Continued)

(58) Field of Classification Search
CPC ..... B23B 31/113; B23B 31/008; B23B 31/19; B23B 2231/36; B23B 2240/04;
(Continued)

(56) References Cited

U.S. PATENT DOCUMENTS 2,767,564 A * 10/1956 Green .................... B23B 31/08
                                                          464/157
5,806,609 A    9/1998 Stoeck et al.
(Continued)

FOREIGN PATENT DOCUMENTS

CH              698 953 B1    12/2009
DE     10 2012 204 491 A1     9/2013
(Continued)

OTHER PUBLICATIONS

PCT/EP2017/054865, International Search Report (PCT/ISA/220 and PCT/ISA/210) dated May 26, 2017, with partial English translation, enclosing Written Opinion of the International Searching Authority (PCT/ISA/237) (Thirteen(13) pages).

*Primary Examiner* — Eric A. Gates
*Assistant Examiner* — Chwen-Wei Su
(74) *Attorney, Agent, or Firm* — Crowell & Moring LLP

(57) ABSTRACT

A handheld core drilling device includes a tool receptacle where the tool receptacle has a receiving sleeve and a tool receiving piece disposed in the receiving sleeve. A compression spring arrangement is disposed within the receiving sleeve. Exactly three equally spaced retaining tabs are formed on the receiving sleeve along a circumferential direction and each retaining tab has a respective stop surface that faces the tool receiving piece. Exactly three equally spaced bearing surfaces are formed on the tool receiving piece along a circumference of the tool receiving piece and each bearing surface faces a respective stop surface. Each of the bearing surfaces includes a stud with a stud surface where the stud surfaces in a radial direction are at most half as wide as the bearing surfaces in the radial direction.

10 Claims, 10 Drawing Sheets

(52) U.S. Cl.
 CPC ....... *B23B 51/0406* (2013.01); *B23B 2226/31* (2013.01); *B23B 2240/04* (2013.01); *Y10T 279/17863* (2015.01); *Y10T 408/95* (2015.01)

(58) Field of Classification Search
 CPC ..... Y10T 279/17863; Y10T 279/17888; Y10T 279/33; Y10T 408/95
 See application file for complete search history.

(56) References Cited

U.S. PATENT DOCUMENTS

| | | | |
|---|---|---|---|
| 5,820,312 | A | 10/1998 | Stoeck et al. |
| 7,534,076 | B2 * | 5/2009 | Agehara ............. B23B 51/0473 175/403 |
| 2005/0260048 | A1 | 11/2005 | Agehara et al. |
| 2009/0110497 | A1 | 4/2009 | Miller et al. |
| 2015/0104264 | A1 * | 4/2015 | Vogel .................... B23B 31/005 408/204 |

FOREIGN PATENT DOCUMENTS

| | | |
|---|---|---|
| JP | 8-257942 A | 10/1996 |
| JP | 2004-42226 A | 2/2004 |
| JP | 2004-106148 A | 4/2004 |
| JP | 2005-53192 A | 3/2005 |
| JP | 2007-138965 A | 6/2007 |
| JP | 2013-215963 A | 10/2013 |
| WO | WO 2005/014211 A1 | 2/2005 |
| WO | WO-2013139668 A1 * | 9/2013 |

\* cited by examiner

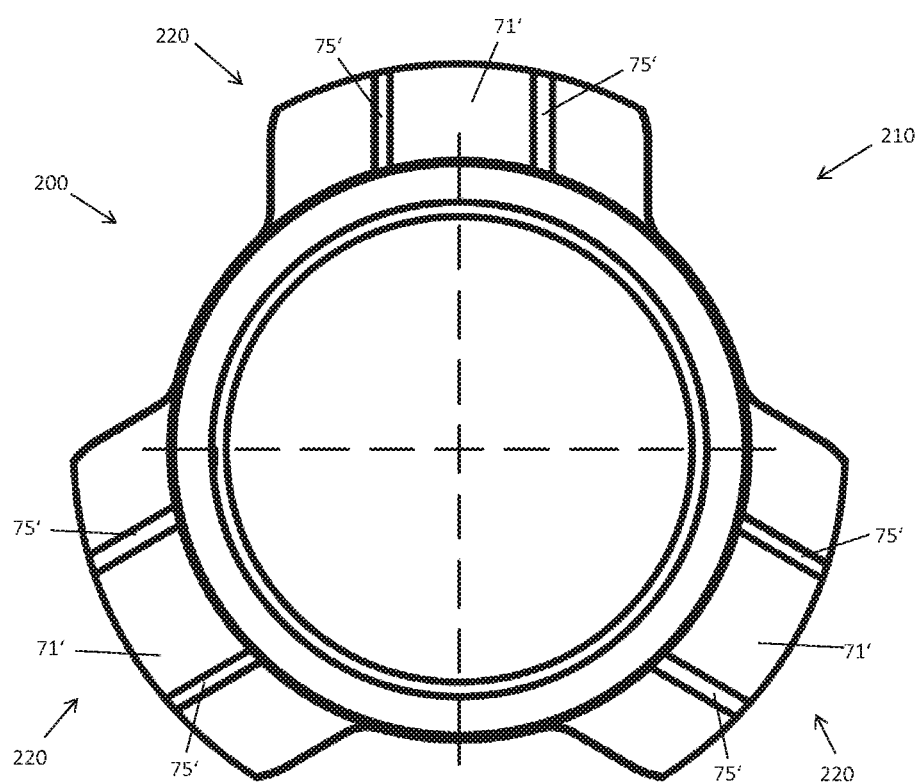

ELECTRICAL HANDHELD CORE DRILLING DEVICE

CROSS REFERENCE TO RELATED APPLICATIONS

This application claims the priority of International Application No. PCT/EP2017/054865, filed Mar. 2, 2017, and European Patent Document No. 16158453.7, filed Mar. 3, 2016, the disclosures of which are expressly incorporated by reference herein.

BACKGROUND AND SUMMARY OF THE INVENTION

The invention relates to an electric handheld core drilling device, a diamond core bit and a handheld core drilling system with an electric handheld core drill and a diamond core bit.

A known-from-the-prior-art electric hand-held core drilling device has a tool receptacle for receiving a diamond drill bit, wherein the tool receptacle has a receiving sleeve and a tool receiving piece disposed therein, which is driven during operation of the hand core drill around an axis of rotation in the operating direction, and with a compression spring arrangement, which is arranged within the receiving sleeve and which supports the receiving sleeve and the tool receiving piece resiliently against each other.

The receiving sleeve has a central insertion opening through which an insertion end of the diamond drill bit can be inserted into the tool receiving piece when the insertion with respect to the insertion in a insertion rotation position and the compression spring arrangement is pressure-loaded.

The insertion end is secured in the central insertion opening against withdrawal coaxial with the axis of rotation when the insertion end is located in the tool receiving piece and with respect to the insertion in a locking rotational position and the compression spring arrangement is relatively less pressure-loaded.

On the receiving sleeve along a circumferential direction of the insertion opening, three equally spaced retaining tabs are formed, each having a stop surface, which respectively face the tool receiving piece, wherein the insertion end, if this is secured against withdrawal coaxially with the axis of rotation, by means of three contact surfaces formed on the insertion end, abuts the stop surfaces.

Under a rotational position for insertion, in the context of the present invention, such a rotational position of the insertion end, based on the axis of rotation to be understood in which the three retaining bolts, which are preferably equally spaced along a circumferential direction of the insertion end at the insertion end, at the retaining tabs of the receiving sleeve, can be inserted unhindered in the axial direction in the central insertion opening.

Under a blocking rotational position in turn one means, based on the rotational axis, to the insertion rotational angle of the insertion end. In this blocking rotational position, pulling out the insertion end from the receiving sleeve is impossible due to the retaining bolt whose path is blocked by the retaining tabs.

It is an object of the present invention to provide an electric handheld core drill which favors a quick bit change and a low-wear operation.

This object is achieved in that along a circumference of the tool receiving piece exactly three equally spaced bearing surfaces are formed on the tool receiving piece, each facing the stop surfaces, wherein the bearing surfaces in turn, based on the stop surfaces, oppositely-oriented axial stop for the insertion end of the diamond drill bit which is in the rotational blocking position, formed by means of mating bearing surfaces on the insertion end, wherein from the bearing surfaces, the bearing surfaces each delimiting one side, exactly three evenly spaced studs protrude, on each of which a stud surface is formed whose respective surface normal is oriented perpendicular to the axis of rotation and tangential to the circumferential direction, so that a torque transmission in the operating direction of rotation from the tool receiving piece to the insertion end, if this is in blocking rotational position and the compression spring arrangement is comparatively less pressure-loaded, exclusively by positive engagement between the three stud surfaces and corresponding stud mating surfaces at the insertion end takes place, wherein each of the three stud surfaces in the radial direction are at most half as wide as a respective bearing surface in the radial direction.

The invention includes the realization that the torque which can be transmitted by the tool receptacle can be increased by the stud surfaces according to the invention. This be a spring force of about 1600 N in a disc spring arrangement.

Characterized in that according to the invention, each of the three stud surfaces in the radial direction is at most half as wide as a respective stop surface in the radial direction, at the same time preventing jamming of the insertion end in the tool receiving piece as far as possible.

By means of the stud surfaces provided according to the invention, there is a decoupling between torque transmission in the operating direction of rotation and spring force action of the compression spring arrangement along the axis of rotation.

In a particularly preferred embodiment, the stop surfaces are formed flat, so that they form a sliding contact with the corresponding contact surfaces at the insertion end and thus, at least in the area of the stop surfaces between the receiving sleeve and insertion end in the blocking rotational position, a rotational degree of freedom around the axis of rotation remains unsecured.

In other words, the insertion end and the receiving sleeve are not rotationally secured relative to each other via an anti-twist device in the area of the stop surfaces. If, at least between the receiving sleeve and the insertion end, a rotational degree of freedom about the rotational axis remains unsecured in the area of the stop surfaces, this does not exclude that an actual relative twisting between the receiving sleeve and the insertion end is ensured upon rotation in the operating direction of rotation. In fact, this is required for the torque transfer between the tool receiving piece and the insertion end.

Due to the fact that at least between the receiving sleeve and the insertion end in the area of the stop surfaces with the insertion end located in the blocking rotational position, preferably a rotational degree of freedom about the rotational axis remains unsecured, so that an adhesion of the insertion end and the receiving sleeve, which is undesirable for the removal of the diamond drill bit, is avoided. The fact that in this embodiment, both the stop surfaces and the corresponding contact surfaces are configured free of locking means or the like, an undesirable accumulation of construction dust, which can lead to such arrest, largely avoided.

It has proven to be advantageous if the studs each have a plateau, which is spaced from the stop surface. A respective surface normal of the plateau may be oriented parallel to the axis of rotation. Preferably, a respective stud surface is perpendicular to the respective plateau and may limit a stud tip. Preferably, a stud tip extends from the plateau in the direction of the respective retaining tab.

It has proven to be advantageous if the stud tip extends along at least one third of the plateau along a rotational axis of the closest circumferential portion of the stud. Preferably, the stud tip extends over at most two thirds of the plateau along the circumferential axis of rotation of the stud closest to the axis of rotation.

In a further preferred embodiment, a respective one of the three stud surfaces extends in the radial direction at most half as wide as a respective plateau in the radial direction. This can significantly reduce unwanted jamming of the male end in the tool receptacle be a torque-intensive operation.

It has proved to be advantageous if a side wall extending in the radial direction of a respective stud, which preferably extends between a respective plateau and a respective bearing surface, is inclined at 30° to the axis of rotation.

It has been found to be advantageous that the compression spring assembly when the insertion end is located in the tool receiving piece and is located with respect to the insertion end in a blocking rotational position, wherein the compression spring arrangement exerts a spring force of about 1600 N between the tool receiving piece.

A (higher) pressure-loaded state of the compression spring arrangement is to be understood to mean the state of the compression spring arrangement, in which the compression spring arrangement is compressed. This is the case when the receiving sleeve is pressed in the direction of a male diamond drill bit to enable threading the three retaining bolts formed at the insertion end of the three on the flat tabs past and through the insertion opening. Such pre-pressing of the receiving sleeve can be realized for example by a pressure plate provided on a housing of the handheld core drilling device with an associated pressure lever.

A comparatively less pressure-loaded state of the compression spring arrangement is understood to mean such a state of the compression spring arrangement, in which the compression spring arrangement is less compressed compared to the compressed state. This is the case when the receiving sleeve, with inserted insertion end, is in its original position, in which no external pressure, for example, by a pressure plate of the electric handheld core drilling device is exerted on the receiving sleeve. In this state, the stop surfaces formed on the retaining tabs are subjected to pressure on the corresponding contact surfaces at the insertion end.

It has proven to be advantageous if the compression spring arrangement consists of five series-connected disc springs. Preferably, the spring force is approximately 1600 N, which the compression spring arrangement exerts on the tool receiving piece by a corresponding equivalent spring constant of the five series-connected disc springs at a given extension.

It has proven to be advantageous if the tool receptacle has a sealing ring consisting of an elastically deformable plastic. Preferably, the plastic has a Shore hardness of less than 25. This can reduce any preload losses when clamping the drill bit. Preferably, the sealing ring is disposed within the tool receiving piece, more preferably, the sealing ring is supported against the insertion end, if this is located in the tool receiving piece.

In a further preferred refinement, a knurl is formed on an outer surface of the receiving sleeve, such that the receiving sleeve rotates annularly. Preferably, the knurl forms exactly a closed ring which, based on the axis of rotation over extends at least one third and at most two thirds of the length of the receiving sleeve.

The invention is also solved by a diamond bit, in particular for a prescribed hand-held core drilling device. The diamond drill bit has exactly one insertion end passing through a central insertion opening into the tool receiving piece of the handheld core drilling device. At the insertion end, preferably circumferentially uniformly spaced from each other, exactly three retaining bolts are formed, which are provided for engagement with retaining tabs, which in turn are formed on a receiving sleeve enclosing the tool receiving piece The retaining bolts may each have a contact surface which corresponds to a stop surface on the respective retaining tabs. Particularly preferably, each of the retaining bolts has a mating bearing surface whose surface normal runs in each case parallel to the axis of rotation.

Preferably, three equally spaced stud mating surfaces are formed at the insertion end along the circumferential direction, which may be perpendicular to the respective mating bearing surfaces and which are preferably set against a peripheral edge surface of the retaining bolt.

Particularly preferably, the contact surfaces are formed flat, so that they form a sliding contact with the corresponding stop surfaces on the retaining tabs and thus, at least between receiving sleeve and insertion end in the region of the contact surfaces located in the insertion end located in a blocking rotational position, a rotational degree of freedom around the axis of rotation remains unsecured.

The diamond bit may be further developed by features already described with respect to the handheld core drilling device.

The invention is also solved by a handheld core drilling system having a previously described hand core drilling device and a diamond core bit as described above.

Further advantages arise from the following description of the Figures. In the Figures, various embodiments of the present invention are shown. The Figures, the description and the claims contain numerous features in combination. The person skilled in the art will expediently also consider the features individually and combine them into meaningful further combinations.

In the Figures, the same and similar components are numbered with the same reference numerals.

BRIEF DESCRIPTION OF THE DRAWINGS

FIG. 10 is a front view of the insertion end of the diamond drill bit according the invention.

DETAILED DESCRIPTION OF THE DRAWINGS

Figure 1:
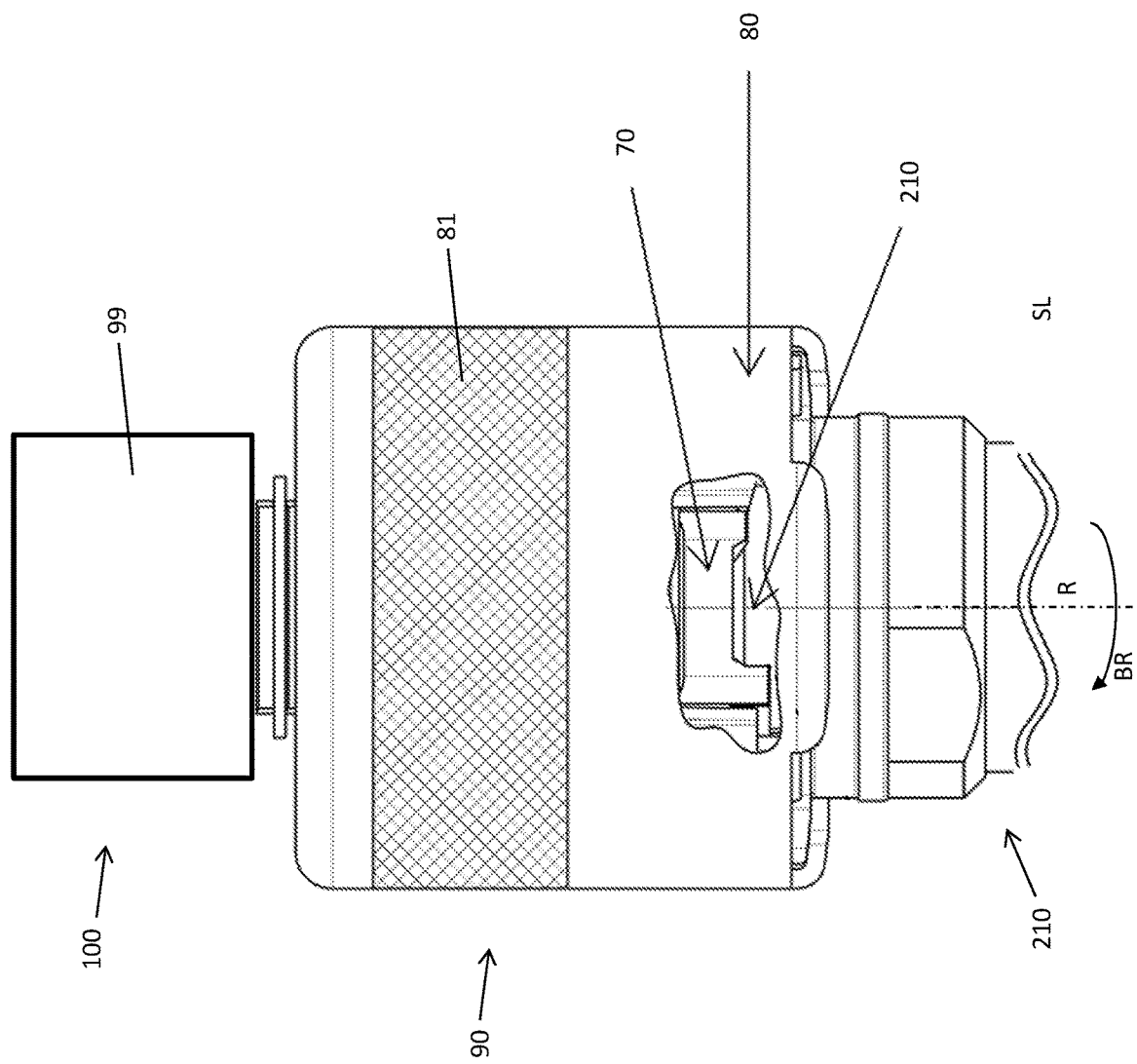
FIG. 1 is a schematic representation of a tool receptacle according to the invention with a male end of a diamond drill bit according to the invention.

FIG. 1 shows a tool holder 90 of an electric handheld core drilling device 100, not shown further here. The tool receptacle 90 has a cylindrical receiving sleeve 80. In the receiving sleeve 80, a tool receiving piece 70 is arranged. The tool receiving piece 70 serves to receive a diamond drill bit 200.

Figure 2:
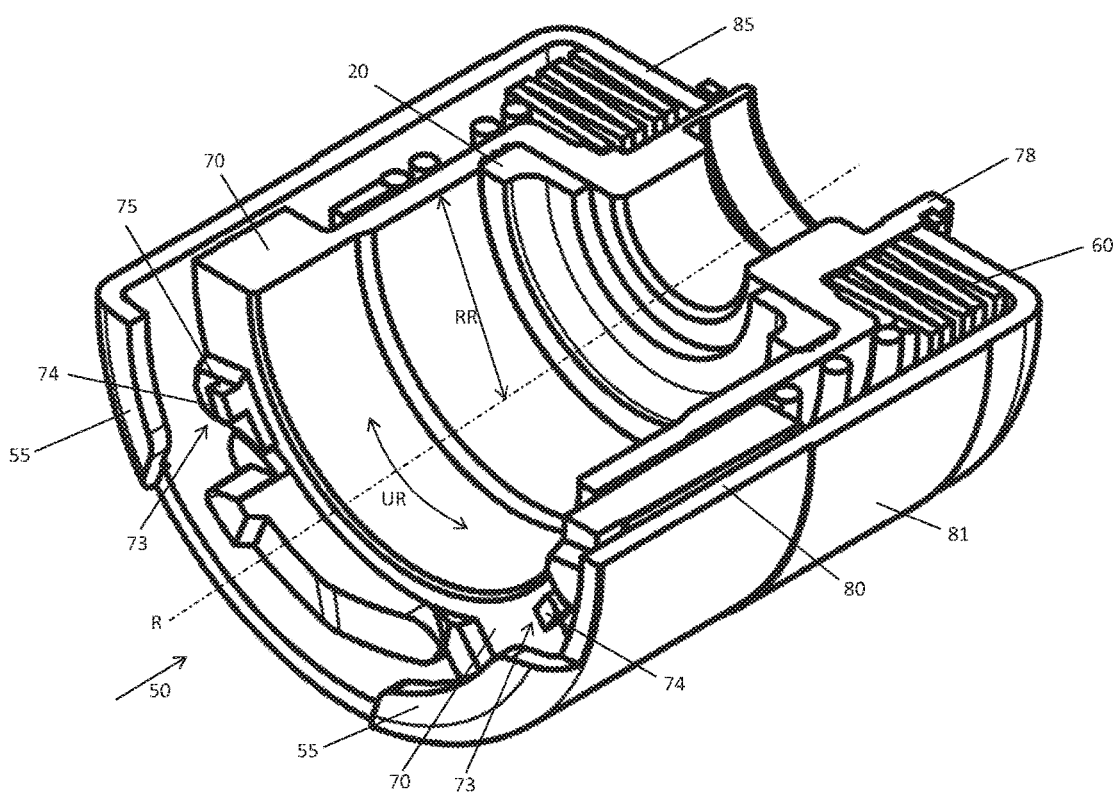
FIG. 2 shows a first sectional view of the tool receptacle according to the invention with compression spring arrangement in the pressure-loaded state.

The tool receiving piece 70 is driven during operation of the hand core drilling apparatus 100 about an axis of rotation R in the operating direction of rotation BR (see FIG. 2).

Within the receiving sleeve 80, a compression spring arrangement 60 is arranged, which supports the receiving sleeve 80 and the tool receiving piece 70 resiliently against each other. In the embodiment of FIG. 1, the compression spring arrangement 60 consists of five series-connected disc springs.

The receiving sleeve 80 has a central insertion opening 50, in FIG. 2 on the left side, through which a male end of the diamond drill bit can be inserted into the tool receiving piece 70.

On the receiving sleeve 80 along a circumferential direction UR three equally spaced retaining tabs 55 are formed. These each have a stop surface 57 (see also FIG. 3), which respectively face the tool receiving piece 70. These stop surfaces 57 form stop surfaces for corresponding contact surfaces 57' which are formed on the insertion end 210 of the diamond drill bit 200 (see FIG. 9).

Along a circumference UR of the tool receiving piece 70 exactly three uniformly spaced bearing surfaces 71 are formed on the tool receiving piece 70. These bearing surfaces 71 are each facing the stop surfaces 57. The bearing surfaces 71, in turn, form an axial stop for the insertion end 210 oriented in opposite directions relative to the stop surfaces 57, specifically for mating bearing surfaces 71' formed on the insertion end 210 (cf. FIGS. 8, 9 and 10).

From the bearing surfaces 71, the bearing surfaces 71 each bounded on one side, protrude exactly three equally spaced studs 73 from. Due to the sectional view of FIG. 1, only two of the three studs 73 can be seen. At each of these studs 73, a stud surface 75 is formed, the surface normal is oriented perpendicular to the axis of rotation R and tangential to the circumference U. Thus, a torque transmission in the operating direction of rotation BR from the tool receiving piece 70 to the insertion end 210 (see FIG. 1) exclusively by positive engagement between the three stud surfaces 75 and corresponding stud counter surfaces 75' at the insertion end 210 (see FIG. 8) can be achieved.

Figure 3:
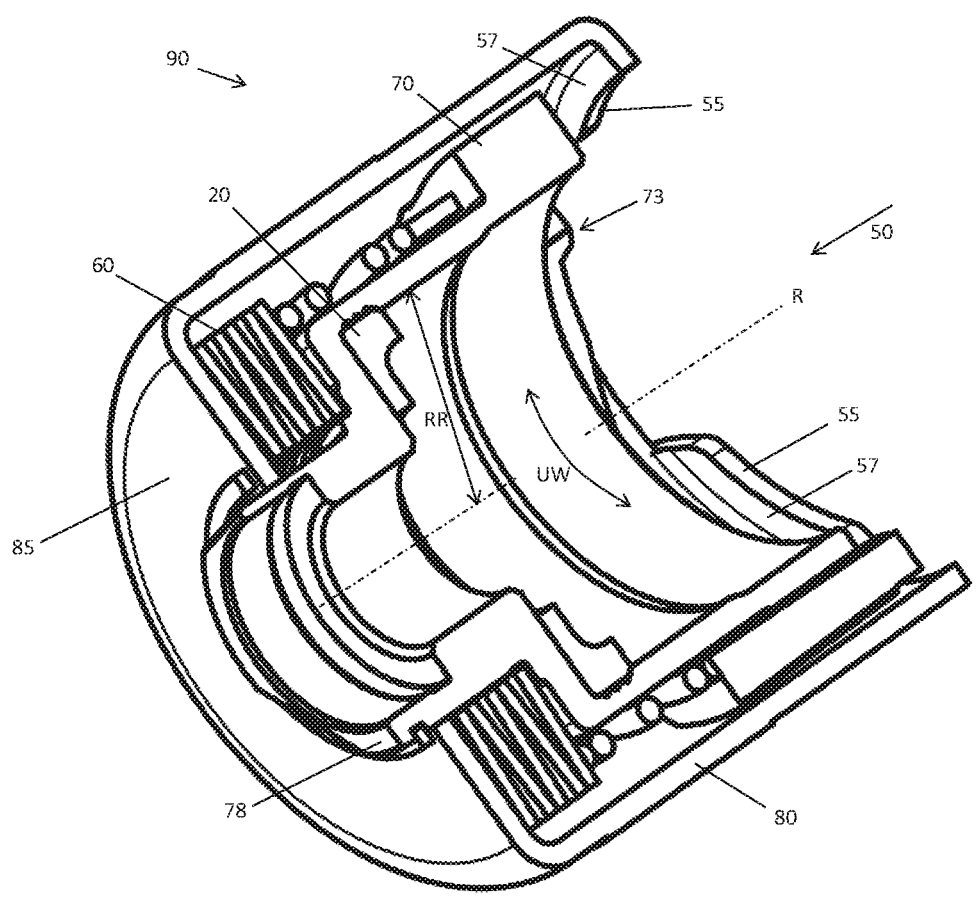
FIG. 3 shows a second cross-sectional view of the tool receptacle according to the invention with a compression spring arrangement in the pressure-loaded state.
Figure 5:
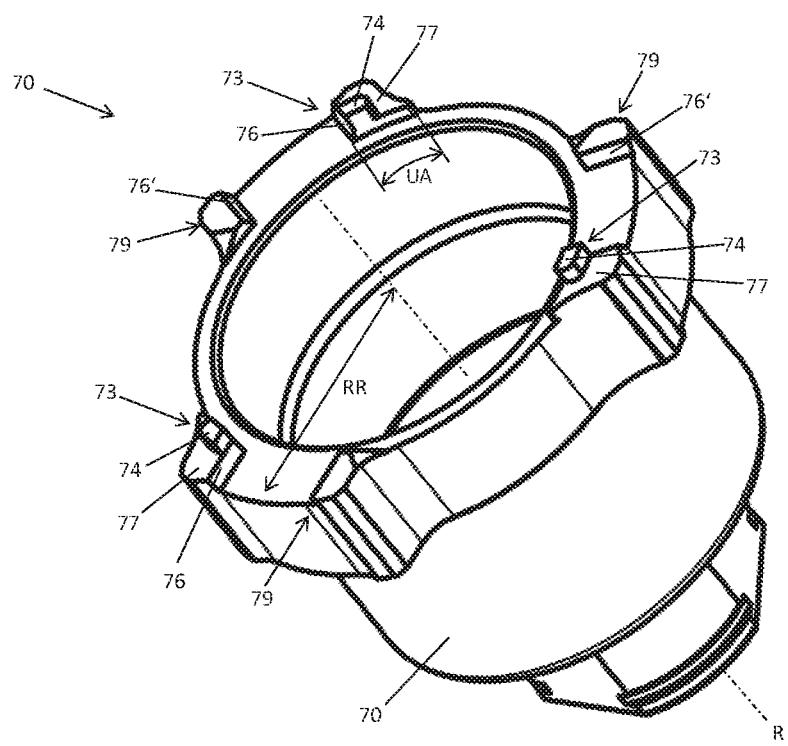
FIG. 5 is a perspective schematic representation of a tool receiving piece.

As can be seen in FIGS. 2, 3 and 5, each of the three stud surfaces 75 extends in the radial direction RR at most half as wide as a respective bearing surface 71 in the radial direction RR. This allows both a positive torque transmission between the three stud surfaces and corresponding stud mating surfaces 75' to take place and jamming can be substantially excluded.

As can likewise be seen from FIG. 5, each of the three studs 73 has a respective plateau 77, which is spaced from the bearing surface 71 and whose surface normal is in each case parallel to the axis of rotation. In other words, the plateaus 77 extend parallel and spaced from the bearing surfaces 71. The stud surfaces 75 provided for the positive torque transmission are each perpendicular to the plateau 77.

The stud surface 75 defines laterally a stud tip 74, which extends from the plateau 77 in the direction of the respective retaining tab 55. In this case, the stud tip 74 extends along a circumferential section UA of the stud 73 closest to the axis of rotation R over at least one third and at most two thirds of the plateau 77.

As can also be seen in FIGS. 2 and 5, a respective one of the three stud surfaces 75 extends in the radial direction RR at most half as wide as a respective plateau 77 in the radial direction RR.

At the respective stud 73, a side wall 76 is formed, which extends in the radial direction RR. This side wall 76 extends between a respective plateau 77 and a respective bearing surface 71 and is inclined at 30° to the axis of rotation R.

Above the axis of rotation R on the circumference UW of the tool receiving piece 70, the stud 73 opposite, an advance stud 79 is shown. This advance stud 79 in turn has a side wall 76', which extends in the radial direction RR and the support surface 71 bounded on one side. In this case, the side wall 76' at the feed advance stud 79 is also inclined by 30° to the rotation axis R. When the tool receptacle 90 rotates in the operating direction BR, the advance stud 79 leads the stud 73, wherein no torque is transmitted to the diamond drill bit via the feed advance stud 79.

Figure 4:
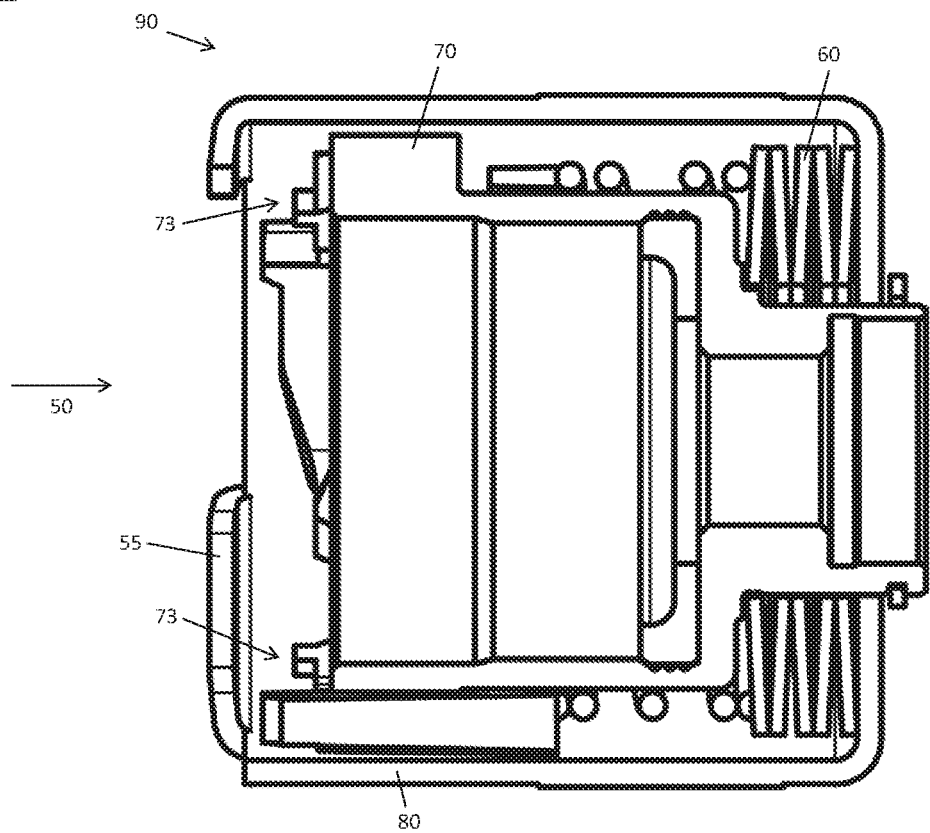
FIG. 4 is a third schematic sectional view of the tool receptacle according to the invention with compression spring arrangement in the pressure-loaded state.

The compression spring arrangement 60, which consists in the embodiment of FIGS. 2, 3 and 4 or five series-connected disc springs, exerts a spring force of about 1600 N on the tool receiving piece 70, where in FIGS. 2, 3 and 4 of the less pressure-loaded state of the compression spring arrangement is shown, which is recognizable by the fact that a sleeve edge 85 is supported on the receiving sleeve 80 against a corresponding support collar 78 on the tool receiving piece 70.

In the state shown in FIGS. 2, 3 and 4, a plug-in end 210 cannot correspondingly be threaded past the retaining tabs 55 into the tool receiving piece 70. For this, namely the receiving sleeve 80 in FIGS. 2, 3 and 4 would have to be moved to the left, so that the sleeve edge 85 and the support collar 78 are spaced apart and thus the distance between retaining tabs 55 and bearing surfaces 71 is increased, so that the retaining bolt 220 formed at the insertion end 210 can be threaded past the retaining tabs 55. This is only possible if the insertion end is located in an insertion rotational position with respect to the axis of rotation R, that is, the retaining bolt 220 formed at the insertion end 210 respectively in the axial direction, can be pushed through by the space, which is formed by two adjacent retaining tabs 55.

An insertion is not possible if the insertion end 210, with respect to the rotation axis R, is twisted into a blocking rotational position, in which case insertion of the insertion end 210 into the tool receiving piece 70 would be impossible. At the same time, however, when the insertion end 210 is located in the tool receiving piece 70 (see FIG. 1), as desired, axial removal of the insertion end 210 from the tool receiving piece 70 is prevented.

The tool receptacle 90 of FIGS. 2, 3 and 4 likewise has a sealing ring 20 consisting of an elastically deformable plastic having a Shore hardness of less than 25. 2, 3 and 4 can be seen, the sealing ring 20 is disposed within the tool receiving piece 70 and is supported against the insertion end 210 (see FIG. 2), if this is located in the tool receiving piece 70.

Indicated on the upper side of the receiving sleeve 80 is a knurl 81, which rotates the receiving sleeve 80 in an annular manner. This facilitates the change of the diamond core bit.

Figure 7:
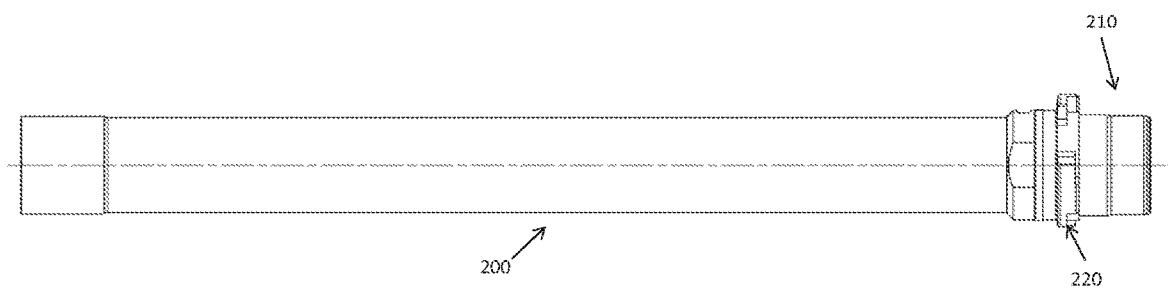
FIG. 7 is a schematic representation of the diamond drill hit according to the invention

A diamond drill bit 200 according to the invention is shown in FIG. 7

The diamond drill bit 200 from FIG. 2 has an insertion end 210 which can be inserted through a central insertion opening 50 (see FIG. 2) into a tool receiving piece 70 (cf. FIG. 1 tool receiving piece 70).

At the insertion end 210, exactly three retaining bolts 220 are formed in the circumferential direction U, uniformly spaced from each other. Of these three retaining bolts 22, only two can be seen from FIG. 8 due to the perspective view.

The retaining bolts 220 are provided with retaining tabs for engagement (see FIG. 3 retaining tabs 55).

Each of the retaining bolts 22 has a contact surface 57' which corresponds to a stop surface 57 on the respective retaining tabs 55 (cf., FIGS. 2 and 3). The retaining bolts 220 have a mating-bearing surface 71' whose surface normal runs in each case parallel to the axis of rotation R. The mating bearing surfaces 71' are used to bear on the bearing surfaces 71 of the tool receiving piece 70 (cf. FIG. 1).

At the insertion end 210 along the circumferential direction U, three equally spaced stud mating surfaces 75' are formed on the retaining bolt 220. These stud mating surfaces 75' are perpendicular to the respective-bearing surfaces 71. Opposite a peripheral edge surface 225 (see also FIG. 8), the stud mating surfaces 75' are set back in the circumferential direction U.

Figure 8:
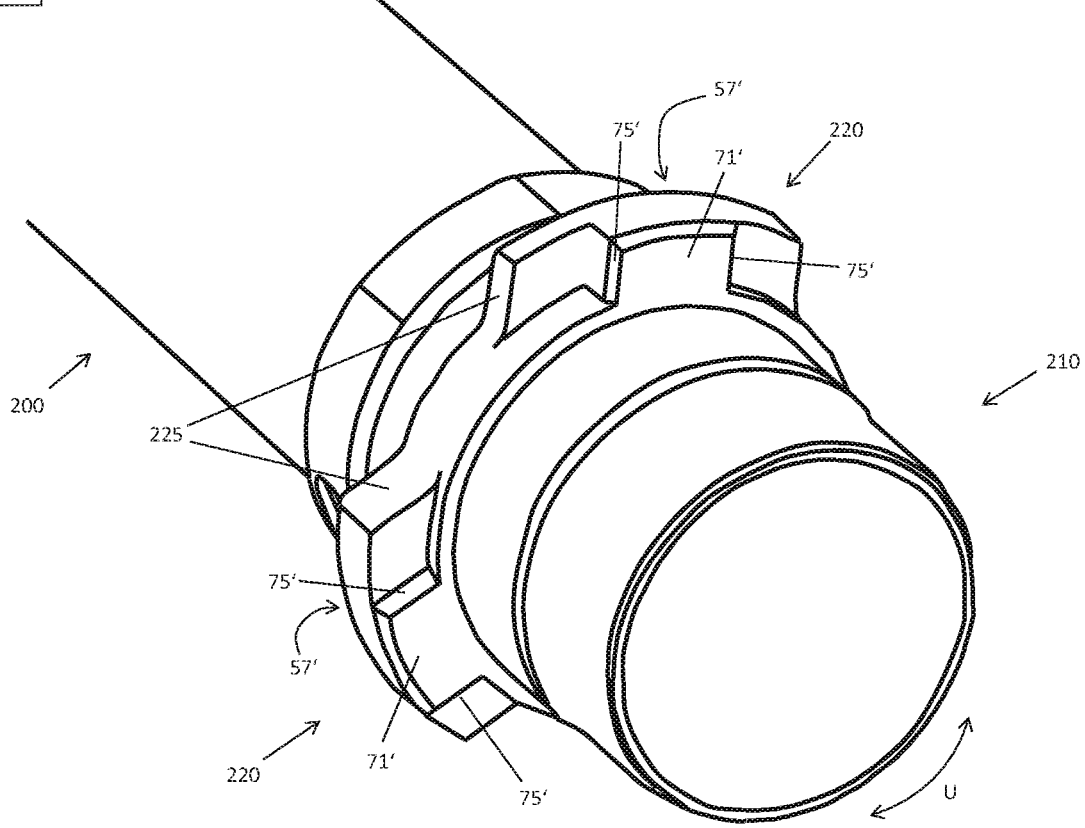
FIG. 8 shows a schematic representation of a male end of the diamond drill bit according to the invention.

The stud mating surfaces 75' form a stop for the stud surfaces 75 for the purpose of positive torque transmission. The contact surfaces 57', which are marked here on the back of the retaining bolt 220 due to the representation in FIG. 8, are formed flat, so that they form a sliding contact with the corresponding stop surfaces 57 on the retaining tabs 55, and so at least between the receiving sleeve 80 and insertion end 210 in a blocking rotational position SL (cf. 1), a rotational degree of freedom about the rotation axis R remains unsecured at least in the region of the stop surfaces 57 between receiving sleeve 18 and insertion end 210.

FIG. 1 shows schematically an electrical handheld core drilling device 100 with a housing 99, which is shown here only schematically, on which the tool receptacle 90 is arranged. The tool receptacle 90 of FIG. 3 corresponds, apart from another sectional view, of the tool receptacle 90 of FIG. 1. Therefore, in the following, we will focus on individual details.

It can be easily seen at lower left in FIG. 1, that there is a retaining tab 55, which provides a form-fitting pull-out protection for an insertion end 210. The stop surface 57 is flat and slightly curved in the present case, so that it can form a sliding contact with the corresponding contact surfaces 57'.

The diamond bit 200 is received in the tool receptacle 90. The corresponding contact surface 57' abuts against the stop surface 57 of the retaining tab 55, so that the insertion end 210 is secured against axial withdrawal. Accordingly, from FIG. 1, the locking rotational position SL of the insertion end 210 with respect to the tool receptacle 90 and the sleeve 80 can be seen.

Back to FIG. 2, in which the stud surface 75 provided according to the invention is clearly visible.

Figure 6:
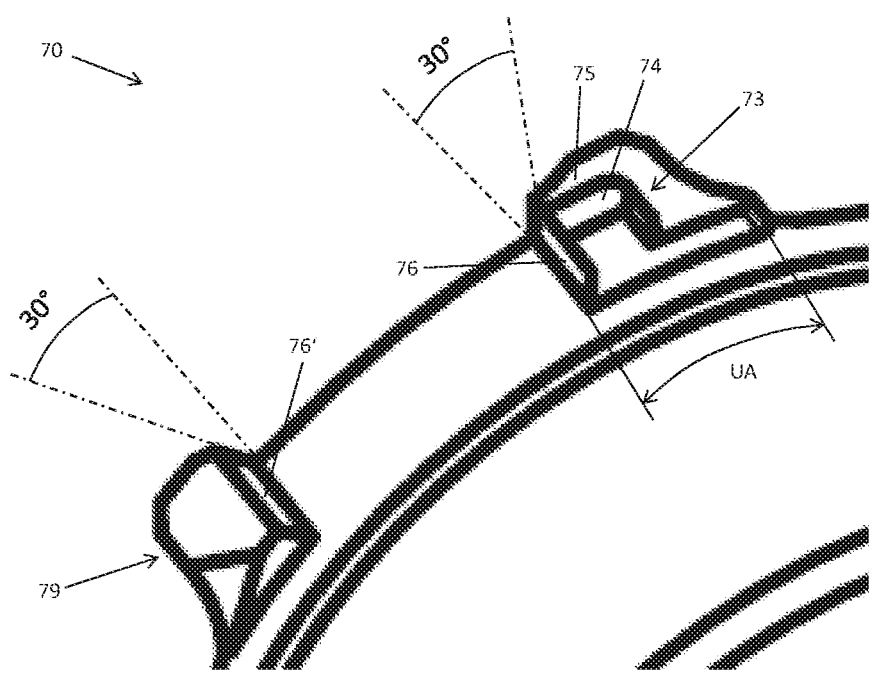
FIG. 6 is a detail view of the tool receiving piece.

The stud 73 formed on the tool receiving piece 70 has a side wall 76 extending in the radial direction RR, which is inclined at 30° to the axis of rotation (compare FIG. 6).

Above this side wall 76 extends the stud surface 75 whose surface normal is perpendicular to the axis of rotation R and tangential to the circumferential direction. It can be clearly seen that the stud surface 75 extends in the radial direction RR at most half as wide as a respective bearing surface 71 in the radial direction RR. In addition, the stud surface 75 extends in the radial direction at most half as wide as the inclined side wall 76.

In FIG. 1, a portion of the receiving sleeve 80 is free to better illustrate the mating between the insertion end 210 and the tool receiving piece 70. In the embodiment of FIG. 1 is the same tool receptacle 90, which has already been explained with reference to 2, 3 and 4.

The stud mating surfaces 75' bear on the stud surface 75, wherein both surface normals are perpendicular to the rotation axis R, so that when the tool receiving piece 70 or the tool receptacle 90 is rotated in the operating direction BR, a positive torque transmission from the tool receiving piece 70 to the insertion end 210 of the diamond drill bit 200 can be done.

In particular, it is illustrated in FIG. 5 that each of the three stud surfaces 75 extends in the radial direction RR at most half as wide as a respective bearing surface 71 in the radial direction RR.

The studs 73 each have a plateau 77, which is spaced from the bearing surface 71 and whose respective surface is oriented parallel to the axis of rotation R. A respective stud surface 75 is perpendicular to the respective plateau 77 and delimits a stud tip 74, which extends from the plateau 77 in the direction of the respective retaining tab 55.

The stud tip 74 extends along one of the rotation axis R nearest peripheral portion UA of the stud 73 over at least one third and at most two-thirds of the plateau 77. Each of the three stud surfaces 75 extends in the radial direction RR at most half as wide as a respective plateau 77 in the radial direction RR.

A side wall 76 of the stud 73 and a side wall 76' of the feed stud 79 are each inclined at 30° to the axis of rotation R, this is shown on the forward stud 79 top left and the stud 73 top left as an example.

Figure 9:
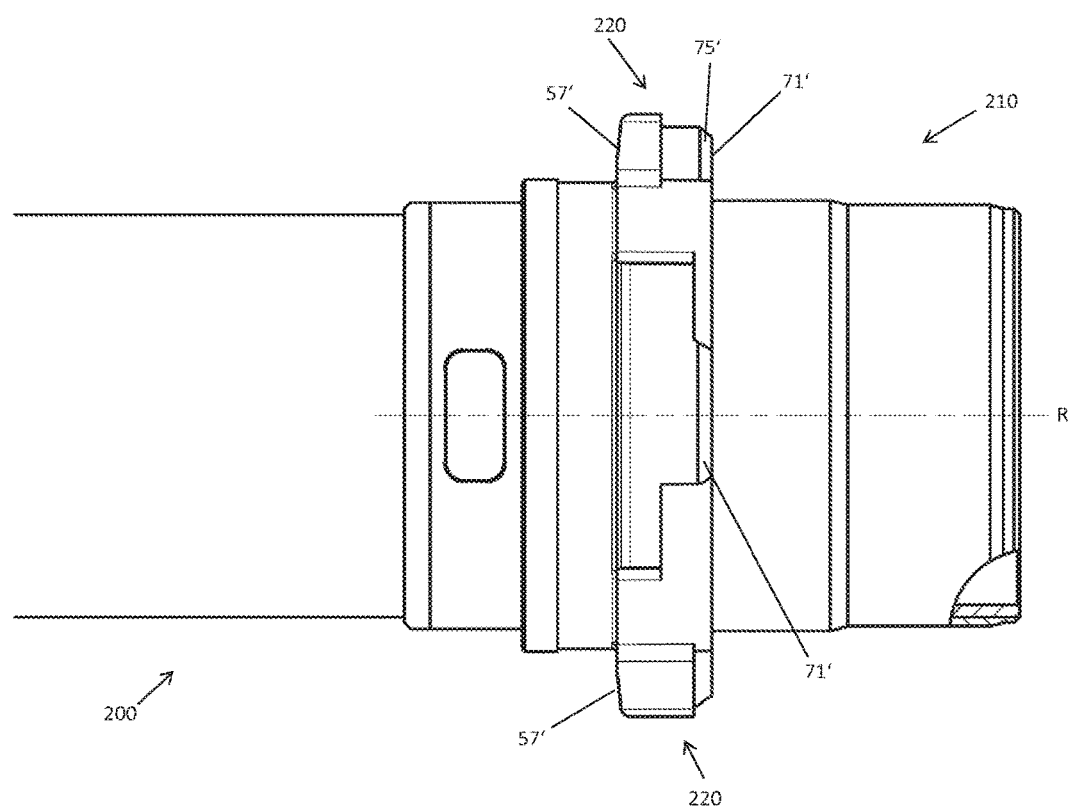
FIG. 9 is a side view of the male end of the diamond core bit according to the invention.

Finally, FIG. 9 shows a diamond drill bit 200 with insertion end 210. The illustration of FIG. 9 shows the same embodiment as FIG. 1. In particular, it can be seen clearly that the corresponding contact surfaces 57' are designed to be flat at the insertion end, i.e. without any latching means. The contact surfaces 57' are formed on the retaining bolt 220.

Each of the retaining bolts 220 has a mating bearing surface 71' whose surface normals each run parallel to the axis of rotation. At the insertion end 210, uniformly spaced stud mating surfaces 75' are formed along the circumferential direction U3 on the respective retaining bolts 220. The stud mating surfaces 75' are perpendicular to the respective mating bearing surfaces 71'.

The stud mating surfaces 75' are set back relative to a peripheral edge surface 225 of the retaining bolt 220.

LIST OF REFERENCE CHARACTERS

20 Sealing ring
50 central insertion opening
55 Retaining tab
57 Stop surface
57' Contact surface
60 Compression spring arrangement
70 Tool receiving piece
71 Bearing surface
71' Mating bearing surface
73 Stud
74 Stud tip
75 Stud surface
75' Stud mating surfaces 76 Side wall of the stud
76' Side wall of the advance stud
77 Plateau
78 Support collar
79 Advance studs
80 Receiving sleeve
81 Knurl
85 Sleeve edge
90 Tool receptacle
99 Housing
100 Electric handheld core drilling device
200 Diamond drill bit
210 insertion ends
220 Retaining bolt
225 Circumferential edge surface
BR operating direction
R Axis of rotation
SL Blocking position
UA Circumferential section
UR Circumferential direction
UW Circumference of the tool receiving piece

The invention claimed is:

1. A handheld core drilling device, comprising:
a tool receptacle for receiving a diamond drill bit, wherein the tool receptacle has a receiving sleeve and a tool receiving piece disposed in the receiving sleeve and wherein the tool receiving piece is drivable around an axis of rotation; and
a compression spring arrangement disposed within the receiving sleeve, wherein the compression spring arrangement supports the receiving sleeve and the tool receiving piece resiliently against each other;
wherein the receiving sleeve has a central insertion opening through which an insertion end of the diamond drill bit is insertable into the tool receiving piece;
wherein exactly three equally spaced retaining tabs are formed on the receiving sleeve along a circumferential direction and wherein each retaining tab has a respective stop surface that faces the tool receiving piece;
wherein exactly three equally spaced bearing surfaces are formed on the tool receiving piece along a circumference of the tool receiving piece and wherein each bearing surface faces a respective stop surface;
wherein each of the bearing surfaces includes a stud with a stud surface;
wherein the stud surfaces in a radial direction are at most half as wide as the bearing surfaces in the radial direction;
wherein the studs each have a plateau which is spaced from the respective bearing surface, wherein the respective stud surface defines a stud tip which extends starting from the plateau in a direction toward the respective retaining tab.

2. The handheld core drilling device according to claim 1, wherein the stop surfaces are formed flat.

3. The handheld core drilling device according to claim 1, wherein the stud tip extends along a circumferential section of the stud closest to the axis of rotation over at least one third and at most two thirds of the plateau.

4. The handheld core drilling device according to claim 1, wherein each of the three stud surfaces extends in the radial direction at most half as wide as the respective plateau in the radial direction.

5. The handheld machine tool according to claim 1, wherein a side wall of a respective stud extends in the radial direction between the respective plateau and the respective bearing surface and is inclined at a 30 degree angle to the axis of rotation.

6. The handheld core drilling device according to claim 1, wherein the compression spring arrangement, when the insertion end of the diamond drill bit is disposed in the tool receiving piece and with respect to the central insertion opening in a locking rotational position and the compression spring arrangement is comparatively less pressure-loaded, a spring force between 300 Newtons and 340 Newtons is exerted on the tool receiving piece.

7. The handheld core drilling device according to claim 1, wherein the compression spring arrangement consists of five series-connected disc springs.

8. The handheld core drilling device according to claim 1 further comprising a sealing ring formed of an elastically deformable plastic having a Shore hardness smaller than 25, wherein the sealing ring is disposed within the tool receiving piece.

9. The handheld core drilling device according to claim 1, wherein a knurl is formed on an outer surface of the receiving sleeve which encircles the receiving sleeve annularly.

10. A handheld core drilling system, comprising:
the handheld core drilling device according to claim 1; and
a diamond core bit configured to mate with the handheld core drilling device, wherein the diamond core bit includes:
an insertion end which is insertable into the tool receiving piece of the handheld core drilling device;
wherein at the insertion end, exactly three retaining bolts are formed in a circumferential direction and are evenly spaced from each other, wherein the retaining bolts each have a contact surface, a mating bearing surface whose surface normal runs parallel to an axis of rotation, and a stud mating surface extending perpendicular to the respective mating bearing surface and set back relative to a peripheral edge surface of the retaining bolt in the circumferential direction;
wherein the respective contact surfaces are formed flat such that they form a sliding contact with corresponding stop surfaces on the retaining tabs of the handheld core drilling device.

* * * * *